(12) United States Patent
Shikisai et al.

(10) Patent No.: US 6,599,978 B1
(45) Date of Patent: Jul. 29, 2003

(54) COPOLYMER, THERMOPLASTIC RESIN COMPOSITION, AND PROCESS FOR PRODUCING THE SAME

(75) Inventors: Yoshifumi Shikisai, Otake (JP); Hisaya Yokohama, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/700,794

(22) PCT Filed: May 19, 1999

(86) PCT No.: PCT/JP99/02604

§ 371 (c)(1),
(2), (4) Date: Nov. 20, 2000

(87) PCT Pub. No.: WO99/60040

PCT Pub. Date: Nov. 25, 1999

(30) Foreign Application Priority Data

May 19, 1998 (JP) ............................................. 10-137110

(51) Int. Cl.$^7$ ......................... C08L 33/24; C08L 39/04; C08L 57/10

(52) U.S. Cl. ............................ 525/73; 525/74; 525/282; 525/285; 525/313

(58) Field of Search .................................. 525/282, 313, 525/73, 74, 285

(56) References Cited

FOREIGN PATENT DOCUMENTS

| JP | 59-49209 | 3/1984 |
|---|---|---|
| JP | 3-205411 | 9/1991 |
| JP | 4-356501 | 12/1992 |
| JP | 5-86112 | 4/1993 |
| JP | 5-148310 | 6/1993 |
| JP | 6-145215 | 5/1994 |
| JP | 7-133326 | 5/1995 |

*Primary Examiner*—Ana Woodward
(74) *Attorney, Agent, or Firm*—Oblon, Spivak, McClelland, Maier & Neustadt, P.C.

(57) ABSTRACT

A copolymer comprising a maleimide-based monomer unit and/or an unsaturated dicarboxylic acid anhydride-based monomer unit, where the copolymer contains an unreacted maleimide-based monomer and/or an unsaturated dicarboxylic acid anhydride-based monomer in an amount of 200 ppm or less and an adduct of a compound other than the polymerized units of the copolymer and the maleimide-based monomer and/or unsaturated dicarboxylic acid anhydride-based monomer in an amount of 0.1 to 3,000 ppm.

18 Claims, No Drawings

US 6,599,978 B1

COPOLYMER, THERMOPLASTIC RESIN COMPOSITION, AND PROCESS FOR PRODUCING THE SAME

TECHNICAL FIELD

The present invention relates to a maleimide-based and/or an unsaturated dicarboxylic acid anhydride-based copolymer excellent in heat resistance, transparency, mechanical strength and moldability, unlikely to thermal degradation, small in an extent of coloration and deterioration occurring in the process of molding, and superior in appearance after molding, a thermoplastic resin composition comprising said copolymer and a rubbery polymer, and processes for producing said copolymer and said thermoplastic resin composition.

BACKGROUND ART

Recently, in the fields of electric instruments and automobile industry, there has been a tendency of attaching importance to a design property, and materials used in these fields have been required to have a high mechanical performance, a light weight and an excellent appearance for such a tendency. In order to satisfy such a requirement, polycarbonate-based resins and polyphenylene ether-based resins, both of which belong to a material field called engineering plastics, has been used, and SMI resin, namely a copolymer of styrene and N-phenylmaleimide, has been developed and used. Although these resins are superior in heat resistance, they are inferior in moldability. Currently, the shape of resin articles is becoming more complicated to satisfy the desire for a design property and their wall thickness is becoming smaller to satisfy the desire for lessening the weight. Under such a condition, an easiness of handling at the time of molding has been paid an attention to as one of the material performances also from an aspect of improving the product yield and saving energy and resources. For such a viewpoint, a resin material superior in moldability and having a heat resistance comparable to that of engineering plastics has been required.

In order to improve a heat resistance of thermoplastic resins, a resin composition prepared by blending a rubber-reinforced resin with an α-methylstyrene-based copolymer using α-methylstyrene as a component for the copolymer is used. In this case, an inclusion of α-methylstyrene as a component of a resin matrix contributes to a heat resistance. Accordingly, this material has a fault that no sufficient heat resistance can be realized when the content of α-methylstyrene is low, while thermal degradation readily takes place in the process of molding when the content of α-methylstyrene is high.

With the aim of overcoming the above-mentioned fault of α-methylstyrene-based resins, a method of using heat resistant resins comprising a maleimide-based copolymer or an unsaturated dicarboxylic acid anhydride-based copolymer has been proposed in JP-A 61-16955, etc. Further, JP-A-3-205411 has proposed a technique of producing such a maleimide-based copolymer or unsaturated dicarboxylic acid anhydride-based copolymer by the method of continuous solution copolymerization which is said to be desirable from the viewpoint of making uniform a comonomer distribution in the copolymer.

However, the above-mentioned maleimide-based copolymer and unsaturated dicarboxylic acid anhydride-based copolymer contain unreacted unsaturated dicarboxylic acid anhydride-based monomer or unreacted maleimide-based monomer etc., and these unreacted monomers are quite difficult to remove.

In case the unreacted monomers such as unsaturated dicarboxylic acid anhydride-based monomer, maleimide-based monomer or the like remain in the resin in a large quantity, there arises a problem that the resin becomes colored at the time of molding. Further, there is a problem that the unreacted monomers vaporize and exhale to form a silver streak on a surface of molded article to deteriorate an appearance of molded article. Further, there is a problem that the vaporized components of the unreacted monomers are deposited on a mold and contaminates the molded article as a soil to deteriorate an appearance of molded article. Although an operation of beforehand removing of volatile components such as water are generally conducted by subjecting a resin to a preliminary drying prior to molding, it is quite difficult to remove the unreacted monomers by such an operation.

Accordingly, a lowness of the content of unreacted monomers in a resin is very important to the molding work.

It is an object of the present invention to obtain a maleimide-based and/or unsaturated dicarboxylic acid anhydride-based copolymer which is low in the content of unreacted monomer such as a maleimide-based monomer, unsaturated dicarboxylic acid anhydride-based monomer and the like, superior in heat resistance, transparency, mechanical strength and moldability, unlikely to thermal degradation, small in an extent of coloration and deterioration occurring in the process of molding, and excellent in appearance after molding; and a thermoplastic resin composition comprising said copolymer.

DISCLOSURE OF THE INVENTION

The essentiality of the present invention consists in:

(1) a copolymer comprising a maleimide-based monomer unit and/or an unsaturated dicarboxylic acid anhydride-based monomer unit as constitutional components, wherein said copolymer contains an unreacted maleimide-based monomer and/or an unreacted unsaturated dicarboxylic acid anhydride-based monomer in an amount of 200 ppm or less and an adduct of a compound other than the constitutional components of said copolymer and said maleimide-based monomer and/or said unsaturated dicarboxylic acid anhydride-based monomer in an amount of 0.1 to 3,000 ppm;

(2) a thermoplastic resin composition comprising, as constitutional components, (A) 20–90 parts by weight of a maleimide-based copolymer comprising (a) 15–65% by weight of a maleimide-based monomer unit and (b) 85–35% by weight of at least one monomer unit selected from the group consisting of an aromatic vinyl-based monomer and other vinyl-based monomer (the total amount of the monomer units (a) and (b) is 100% by weight), (B) 80–10 parts by weight of a graft polymer obtained by polymerizing at least one monomer selected from the group consisting of an aromatic vinyl-based monomer and other vinyl-based monomer in the presence of a rubbery polymer, and (C) 0–100 parts by weight of other thermoplastic resin, wherein said thermoploastic resin composition contains unreacted maleimide-based monomer in an amount of 10 ppm or less, a volatile component other than said maleimide-based monomer in an amount of 0.5% by weight or less as a total volatile amount, and an adduct of a compound other than the constitutional components of said maleimide-based copolymer and said maleimide-based monomer in an amount of 0.1 to 3,000 ppm;

(3) a process for producing a copolymer comprising, as constitutional components, a maleimide-based monomer unit and/or an unsaturated dicarboxylic acid anhydride-based monomer unit which comprises adding a compound other than the constitutional components of said copolymer before, during or after polymerizing a monomer mixture comprising the maleimide-based monomer and/or the unsaturated dicarboxylic acid anhydride-based monomer, or to a copolymer comprising said monomer units as constitutional components obtained by the polymerization; and (4) a process for producing a thermoplastic resin composition which comprises polymerizing a monomer mixture comprising a maleimide-based monomer, an aromatic vinyl-based monomer and/or other vinyl-based monomer to form a maleimide-based copolymer comprising these monomer units as constitutional components, and then adding to the resulting maleimide-based copolymer a compound other than the constitutional components of said maleimide-based copolymer, said graft copolymer, and optionally other thermoplastic resin.

BEST MODE FOR CARRYING OUT THE INVENTION

As the maleimide-based monomer which can be used for the production of the maleimide-based copolymer of the present invention, maleimide, N-methylmaleimide, N-ethylmaleimide, N-(n-propyl)-maleimide, N-isopropylmaleimide, N-t-butylmaleimide, N-cyclohexylmaleimide, N-phenylmaleimide, N-toluylmaleimide, N-xylylmaleimide, N-naphthylmaleimide and the like can be referred to.

Among these maleimide-based monomers, preferable are N-cyclohexylmaleimide and N-phenylmaleimide, and particularly preferable is N-phenylmaleimide. These maleimide-based monomers can be used alone or in combination of two or more.

As the unsaturated dicarboxylic acid anhydride-based monomers which can be used for producing the unsaturated dicarboxylic acid anhydride-based copolymer of the present invention, maleic anhydride, itaconic anhydride, citraconic anhydride and the like can be referred to, among which maleic anhydride is preferable.

The content of the maleimide-based monomer unit in the maleimide-based copolymer of the present invention is preferably in the range of 15–65% by weight, and more preferably in the range of 20–50% by weight. When the content of the maleimide-based monomer unit is less than 15% by weight, heat resistance of the composition which is an object of the present invention tends to become low. When the content of the maleimide-based monomer unit exceeds 65% by weight, there is a tendency that a fluidity of the composition is inferior and no molded product can be obtained at the time of molding or the resin formed is so brittle that the molded article can be cracked at the time of demolding from the mold.

In the unsaturated dicarboxylic acid anhydride-based copolymer of the present invention, the content of the unsaturated dicarboxylic acid anhydride-based monomer unit is preferably in the range of 5–50% by weight, and more preferably in the range of 10–40% by weight. When the content of the unsaturated dicarboxylic acid anhydride-based monomer unit is less than 5% by weight, the heat resistance which is an object of the present invention tends to become low. When the content of the unsaturated dicarboxylic acid anhydride-based monomer unit exceeds 50% by weight, there is a tendency that a fluidity of the composition is inferior and no molded product can be obtained at the time of molding or the resin formed is so brittle that the molded article can be cracked at the time of demolding from the mold.

The aromatic vinyl-based monomer which can be used in the present invention include, for example, styrene, α-methylstyrene, vinyltoluenes such as p-methylstyrene and the like, halogenated styrenes such as p-chlorostyrene and the like, p-t-butylstyrene, dimethylstyrene, vinylnaphthalenes and the like, among which preferable are styrene and α-methylstyrene. These aromatic vinyl-based monomers can be used alone or in combination of two or more.

As said polymerizable other vinyl-based monomers which can be used in the present invention, vinyl cyanide-based monomer, unsaturated carboxylic ester-based monomer and vinylcarboxylic acid-based monomer etc. can be referred to. As said vinyl cyanide-based monomer, acrylonitrile, methacrylonitrile, vinylidene cyanide and the like can be used, among which acrylonitrile is suitable for use as a starting material of heat-resistant ABS resin. As said unsaturated carboxylic ester-based monomer, for example, methyl acrylate, ethyl acrylate, propyl acrylate, butyl acrylate, 2-ethylhexyl acrylate, n-hexyl acrylate, cyclohexyl acrylate, methyl methacrylate, ethyl methacrylate, propyl methacrylate, butyl methacrylate, phenyl methacrylate, isobornyl methacrylate, benzyl methacrylate, trichloroethyl methacrylate, cyclohexyl methacrylate and the like can be referred to, among which methyl methacrylate is preferable. These unsaturated carboxylic ester-based monomers can be used alone or in combination of two or more. As said vinylcarboxylic acid-based monomer, acrylic acid, methacrylic acid and the like can be referred to, among which methacrylic acid is preferable. These other vinyl-based monomers can be used alone or in combination of two or more.

In the maleimide-based copolymer of the present invention, the total content of the aromatic vinyl-based monomer unit and the copolymerizable other vinyl-based monomer unit is preferably in the range of 85–35% by weight, and more preferably in the range of 80–50% by weight. In the unsaturated dicarboxylic acid anhydride-based copolymer of the present invention, the total content of the above-mentioned monomer units is preferably in the range of 95–50% by weight, and more preferably 90–60% by weight.

In the maleimide-based copolymer of the present invention, the content of an unreacted maleimide-based monomer is preferably 200 ppm or less, more preferably 50 ppm or less and particularly preferably 30 ppm or less; and the content of total volatile components other than the maleimide-based monomer is preferably 0.5% by weight or less and more preferably 0.3% by weight or less. The content of an adduct of a compound other than said constitutional components of the copolymer and said maleimide-based monomer is preferably 0.1–3,000 ppm, and more preferably 0.1–1,000 ppm.

In the unsaturated dicarboxylic acid anhydride-based copolymer of the present invention, the content of an unreacted unsaturated dicarboxylic acid anhydride-based monomer is preferably 200 ppm or less and more preferably 150 ppm or less; the content of total volatile components other than the unsaturated dicarboxylic acid anhydride-based monomer is preferably 0.5% by weight or less; and the content of an adduct of a compound other than the constitutional components of the copolymer and said unsaturated dicarboxylic acid anhydride-based monomer is preferably 0.1–3,000 ppm.

If the content of the unreacted maleimide-based monomer exceeds 50 ppm or if the content of the unreacted unsaturated dicarboxylic acid anhydride-based monomer exceeds 200 ppm, the copolymer tends to become colored and inferior in transparency, and at the time of fabrication there can occur various troubles such as thermal coloration, bleed-out, flying of mists of maleimide-based monomer or unreacted unsaturated dicarboxylic acid anhydride-based monomer. As the total volatile components other than maleimide-based monomer and/or unsaturated dicarboxylic acid anhydride-based monomer in the copolymer, the monomers of the constitutional components, organic solvents and residues of optionally used polymerization initiator and chain transfer agent can be referred to. If total amount of these volatile components exceeds 0.5% by weight, heat resistance of the copolymer tends to be deteriorated and a silver streak can be formed at the time of molding. If the content of the adduct of maleimide-based monomer and/or unsaturated dicarboxylic acid anhydride-based monomer and compounds other than the constitutional components of said copolymer exceeds 3,000 ppm, heat resistance of the composition which is an object of the present invention tends to be deteriorated.

In the thermoplastic resin composition of the present invention comprising a maleimide-based copolymer, a graft polymer and other thermoplastic resin, the content of unreacted maleimide-based monomer is preferably 10 ppm or less and more preferably 5 ppm or less; the content of total volatile components other than maleimide-based monomer is preferably 0.5% by weight or less and more preferably 0.3% by weight or less; and the content of the adduct of a compound other than the constitutional components of maleimide-based copolymer and the maleimide-based monomer is preferably 0.1–3,000 ppm and more preferably 0.1–1,000 ppm; both based on the thermoplastic resin composition.

The thermoplastic resin composition of the present invention comprises a maleimide-based copolymer, a graft polymer and other thermoplastic resin preferably in amounts of 20–90 parts by weight, 80–10 parts by weight and 0–100 parts by weight, respectively, more preferably in amounts of 30–80 parts by weight, 70–20 parts by weight and 0–70 parts by weight, respectively, and particularly preferably in amounts of 30–80 parts by weight, 70–20 parts by weight and 3–70 parts by weight, respectively.

If the content of the unreacted maleimide-based monomer in the thermoplastic resin composition of the present invention exceeds 10 ppm, the thermoplastic resin composition tends to become colored and there can occur various troubles such as thermal coloration of the composition at the time of molding, bleed-out, and flying of mists of maleimide-based monomer. The total volatile components other than the maleimide-based monomer in said thermoplastic resin composition include volatile components originated from the maleimide-based copolymer, volatile components originated from the graft polymer and water etc. If total amount of these total volatile components other than the maleimide-based monomer exceeds 0.5% by weight, heat resistance of the thermoplastic resin composition tends to be deteriorated and silver streak can be formed at the time of molding. If the content of the adduct of the compounds other than the constitutional components of said maleimide-based copolymer and said maleimide-based monomer exceeds 3,000 ppm, heat resistance of the composition which is an object of the present invention tends to be deteriorated.

The maleimide-based copolymer used in the thermoplastic resin composition of the present invention can be the above-mentioned maleimide-based copolymer of the present invention.

The graft polymer used in the thermoplastic resin composition of the present invention can be obtained by polymerizing at least one monomer selected from the group consisting of aromatic vinyl-based monomers and other vinyl-based monomer in the presence of a rubbery polymer and thereby graft-polymerizing said aromatic vinyl-based monomer and/or said other vinyl-based monomer onto said rubbery polymer. As said aromatic vinyl-based monomer and said other vinyl-based monomer, the same aromatic vinyl-based monomers and copolymerizable other vinyl-based monomers as mentioned above as the constitutional components of the maleimide-based copolymer of the present invention can be referred to. The aromatic vinyl-based monomer and said other vinyl-based monomer used herein may be identical with or different from said constitutional components of the maleimide-based copolymer of the present invention, and acrylonitrile, styrene, butyl acrylate and the like are preferably used for this purpose.

As said rubbery polymer, the following can be used, though they are not limitative: rubbery polymer latices obtained by mixing a latex of a diene-based polymer such as butadiene-styrene copolymer obtained by polymerizing butadiene and/or styrene with an acid group-containing copolymer obtained by polymerizing methacrylic acid and/or n-butyl acrylate or the like; composite rubber latices of polybutadiene and butyl acrylate rubber obtained by adding butyl acrylate, allyl methacrylate and/or 1,3-butyleneglycol dimethacrylate or the like to the above-mentioned rubbery polymer latex and polymerizing the acrylate components and the like; polyorganosiloxane latices obtained by mixing an organosiloxane such as octamethylcyclotetrasiloxane or the like with γ-methacryloyloxypropyl-dimethoxymethylsilane or the like; composite rubber latices of an organosiloxane and a butyl acrylate rubber obtained by adding butyl acrylate, allyl methacrylate and/or 1,3-butyleneglycol dimethacrylate or the like to said organosiloxane latex and polymerizing the acrylate component and the like; etc.

As said "other thermoplastic resin" which can be contained in the thermoplastic resin composition of the present invention, vinyl-based polymers obtained by polymerizing a vinyl-based monomer such as acrylonitrile and/or styrene and the like can be referred to, though they are not limitative.

As a process for producing the maleimide-based and/or unsaturated dicarboxylic acid anhydride-based copolymer of the present invention, generally known polymerization processes can be adopted, and such a process can be carried out by adding a compound other than the constitutional components of the maleimide-based and/or unsaturated dicarboxylic acid anhydride-based copolymer before, during, or after the polymerization, or at any step of the production process such as drying, devolatilization, shaping, pelletizing, incorporation of other resins, stabilizers, etc. after the polymerization. It is preferable to add a compound other than constitutional components of the maleimide-based and/or unsaturated dicarboxylic acid anhydride-based copolymer after a completion of a solution polymerization in batch system or at the time of eliminating the volatile components by means of a devolatilizing extruder, and it is particularly preferable to add said compound at the time of eliminating the unreacted monomer, solvents, etc. by means of a devolatilizing extruder in a continuous solution polymerization system.

Similarly to the above, as a method for producing the thermoplastic resin composition of the present invention comprising a maleimide-based copolymer, a graft polymer and other thermoplastic resin, there can be referred to a method of adding a compound other than the constitutional components of the maleimide-based copolymer at the time of producing the maleimide-based copolymer, a method of adding a compound other than the constitutional components of maleimide-based copolymer before or during a melt-kneading of maleimide-based copolymer, graft polymer and other thermoplastic resin, etc.

The graft polymer contained in the thermoplastic resin composition of the present invention can be produced according to the generally known polymerization processes. In producing said graft polymer, 20–80 parts by weight of a rubbery polymer can be used as a solid component, together with 80–20 parts by weight of an aromatic vinyl-based monomer and/or other vinyl-based monomer.

The compound other than the constitutional components of the maleimide-based copolymer and/or the unsaturated dicarboxylic acid anhydride-based copolymer which is to be added to the composition is preferably a conjugated diene-based compound or a compound forming a conjugated diene-based compound through a reaction. As said conjugated diene-based compound, 1,3-butadiene, isoprene, chloroprene, cyclopentadiene, 1,3-cyclohexadiene, furan, anthracene and the like can be referred to. As said compound forming a conjugated diene-based compound through a reaction, dicyclopentadiene and the like can be referred to. Among the above-mentioned compounds, dicyclopentadiene is particularly preferable. These compounds are incorporated into the maleimide-based and/or unsaturated dicarboxylic acid anhydride-based copolymer of the present invention in the form of an adduct with a maleimide-based monomer and/or an unsaturated dicarboxylic acid anhydride-based monomer preferably in an amount of 0.1–3,000 ppm and more preferably in an amount of 0.1–1,000 ppm.

According to the need, a polymerization initiator, a chain transfer agent, a heat stabilizer and the like can be added at the time of producing the copolymer of the present invention. As the polymerization initiators which can be used in the production of the copolymer of the present invention, generally known organic peroxides and azo compounds can be referred to. Said organic peroxides include ketone peroxides, peroxy-ketals, hydroperoxides, dialkyl peroxides, diacyl peroxides, peroxy-esters, peroxy-dicarbonates and the like. As the chain transfer agents which may be used according to the need at the time of producing the copolymer of the present invention, mercaptans, terpene oils, α-methylstyrene dimer and the like can be referred to. As the additives such as heat stabilizer which can be used according to the need at the time of producing the copolymer of the present invention, generally known ones can be used, although those obstructing the polymerization or making troubles such as coloration are undesirable.

In the production of the thermoplastic resin composition of the present invention, a dye, a pigment, a stabilizer, a reinforcing material, a filler, a flame retardant, a lubricant, an antistatic agent, a delustering agent and the like can be added according to the need.

Next, the present invention is explained more concretely by referring to the examples. The invention is by no means limited by these examples.

In the examples presented below, the term "parts" means parts by weight and the term "%" means % by weight. Procedures of the measurements were as mentioned below.

(1) Monomer composition ratio of a copolymer was determined by elementary analyses.
(2) The quantity of residual monomer in a copolymer was measured by gas chromatography. The total quantity of volatile components was calculated as a sum of the quantity of residual monomer determined by gas chromatography and the quantity of water determined by Karl Fischer method. The content of conjugated diene-based compound adduct was measured by gas chromatography.
(3) Reduced viscosity of a copolymer was determined by dissolving 0.2 gram of a sample copolymer in 100 ml of N,N-dimethylformamide and measuring the viscosity by means of Ubbelohde's viscometer at 25° C.
(4) Yellow index (YI) was determined by forming a sample copolymer into a platy test piece having a thickness of 3 mm by means of a one ounce injection molding machine at a cylinder temperature of 260° C. and measuring its YI according to ASTM D-1925. Vicat softening temperature was measured on a similar test piece according to ASTM D-1525 (4.9N). Izod impact strength was measured according to ASTM D256. Melt flow rate was measured according to JIS K7210 at 220° C. under the condition of 98N, provided that the quantity of flow per 10 minutes was measured and expressed in term of grams.
(5) Pollution of a die (a mold) was evaluated by subjecting a copolymer or a thermoplastic resin composition to a molding by means of one ounce injection molding machine at 350° C. repeatedly 100 times, and then visually examining the polluted state of die.

REFERENTIAL EXAMPLE 1

Synthesis of Diene-based Polymer

Into a pressure-resistant reactor equipped with a stirrer, 95 parts of butadiene, 5 parts of styrene, 0.2 part of t-dodecylmercaptan, 0.6 part of sodium oleate, 1.4 parts of potassium dehydroabietate, 0.3 part of potassium persulfate, 0.2 part of anhydrous sodium sulfate and 145 parts of deionized water were added and reacted at 70° C. for 10 hours with stirring to complete a polymerization reaction, thereby to obtain a latex of a diene-based polymer which is a butadiene-styrene copolymer.

REFERENTIAL EXAMPLE 2

Synthesis of Acid Group-containing Copolymer 1 as Particle-enlarging Agent

A reactor equipped with a stirrer was charged with 15 parts of methacrylic acid, 85 parts of n-butyl acrylate, 0.5 part of t-butyl hydroperoxide, 0.003 part of ferrous sulfate, 0.009 part of disodium ethylenediaminetetraacetate, 1.8 parts of potassium oleate, 3.6 parts of sodium dioctyl sulfosuccinate and 145 parts of deionized water, and a polymerization reaction was carried out at 63° C. for 4 hours to obtain a latex of an acid group-containing copolymer 1 as particle-enlarging agent.

REFERENTIAL EXAMPLE 3

Synthesis of Acid Group-containing Copolymer 2 as Particle-enlarging Agent

A reactor equipped with a stirrer was charged with 25 parts of methacrylic acid, 75 parts of n-butyl acrylate, 0.4 part of cumene hydroperoxide, 0.001 part of ferrous sulfate, 0.003 part of disodium ethylenediaminetetraacetate, 2 parts of potassium oleate, 1 part of sodium dioctyl sulfosuccinate, 0.3 part of Rongalit C and 200 parts of deionized water, and a polymerization reaction was carried out at 70° C. for 4 hours to obtain a latex of an acid group-containing copolymer latex 2 as particle-enlarging agent.

REFERENTIAL EXAMPLE 4

Preparation of Vinyl-polymerizable Functional Group-containing Polyorganosiloxane One hundred parts of a siloxane mixture was prepared by mixing 98 parts of octamethylcyclotetra-siloxane and 2 parts of γ-methacryloyloxypropyl-dimethoxymethylsilane. After adding thereto a solution of 0.67 part of sodium dodecylbenzenesulfonate in 300 parts of distilled water and stirring the resulting mixture at 10,000 rpm for 2 minutes by means of a homomixer, the mixture was once passed through a homogenizer under a pressure of 30 MPa to obtain a stable preliminarily mixed latex of organosiloxanes.

Separately, 10 parts of dodecylbenzene-sulfonic acid and 90 parts of distilled water were poured into a reactor equipped with a reagent-feeder, a cooler, a jacket heater and a stirring device to prepare a 10% aqueous solution of dodecylbenzenesulfonic acid.

While keeping the resulting aqueous solution at an elevated temperature of 85° C., the preliminarily mixed organosiloxane latex was dropwise added thereto over a period of 4 hours, after which the resulting mixture was kept at the same temperature as above for one hour and then cooled. Then, the reaction mixture was neutralized with an aqueous solution of sodium hydroxide.

The polyorganosiloxane in the latex had a weight-average particle diameter of 0.05 μm.

REFERENTIAL EXAMPLE 5

Preparation of Graft Copolymer (B-1)

To 60 parts (as expressed in terms of weight of solid component) of the diene-based polymer latex obtained in Referential Example 1 was added 1.3 parts (as expressed in terms of weight of solid component) of the acid group-containing copolymer 1 latex as particle-enlarging agent obtained in Referential Example 2. After stirring the mixture for 30 minutes at a low speed, 1% aqueous solution of sodium hydroxide was added in an amount of 0.09 part as expressed in terms of weight of solid component, and the resulting mixture was kept stirred for an additional 30 minutes at a low speed. As a result, there was obtained a latex of rubbery polymer in which the particles were agglomerated to have a mean particle diameter of 0.3 μm.

To 60 parts (as expressed in terms of weight of solid component) of the rubbery polymer latex obtained above were added 0.45 part of dextrose, 0.005 part of ferrous sulfate heptahydrate and 0.01 part of sodium pyrophosphate, after which the mixture was heated to 65° C. While dropping thereto 13 parts of acrylonitrile, 27 parts of styrene, 0.3 part of t-dodecylmercaptan and 0.2 part of cumene hydroperoxide over a time period of 140 minutes, a polymerization reaction was carried out. When the dropping was completed, 0.05 part of cumene hydroperoxide was added, and after 30 minutes, the same quantity as above of cumene hydroperoxide was additionally added. The resulting mixture was kept in that state for 30 minutes, and then cooled.

The latex thus obtained was thrown into 0.4% aqueous solution of sulfuric acid, in an amount twice of that of the latex, which had previously been heated to 65° C., and then the resulting mixture was heated to 90° C. to coagulate the latex. After repeatedly washing the coagulated latex with water and dehydrating it, the coagulated latex was finally dried to obtain an opaque white colored, powdery graft copolymer (B-1).

REFERENTIAL EXAMPLE 6

Preparation of Graft Copolymer (B-2)

To 45 parts (as expressed in terms of weight of solid component) of the diene-based polymer latex obtained in Referential Example 1 was added 0.8 part (as expressed in terms of weight of solid component) of the acid group-containing copolymer 1 latex as particle-enlarging agent obtained in Referential Example 2, and the mixture was stirred for 30 minutes at a low speed. Then, 1% aqueous solution of sodium hydroxide was added thereto in an amount of 0.09 part (as expressed in terms of weight of solid component) and the resulting mixture was further stirred for 30 minutes at a low speed. Thus, there was obtained a rubbery polymer latex in which the particles were agglomerated to have a mean particle diameter of 0.3 μm.

To 45 parts (as expressed in terms of weight of solid component) of the rubbery polymer latex obtained above were added 0.35 part of dextrose, 0.005 part of ferrous sulfate heptahydrate and 0.01 part of sodium pyrophosphate, and the mixture was heated to 65° C. While adding thereto 16 parts of acrylonitrile, 39 parts of styrene, 0.3 part of t-dodecylmercaptan and 0.3 part of cumene hydroperoxide over a time period of 50 minutes, a polymerization reaction was carried out. Thereafter, the reaction mixture was kept in that state for 30 minutes and then cooled.

The latex thus obtained was thrown into 0.4% aqueous solution of sulfuric acid, in an amount twice of that of the latex, which had previously been heated to 65° C., and then coagulated by heating at 90° C. After repeatedly washing the coagulated product with water and dehydrating it, the coagulated mass was finally dried to obtain an opaque white-colored, powdery graft copolymer (B-2).

REFERENTIAL EXAMPLE 7

Preparation of Graft Copolymer (B-3)

While stirring 100 parts (as expressed in terms of weight of solid component) of the diene-based polymer latex obtained in Referential Example 1, 2 parts (as expressed in terms of weight of solid component) of the latex of acid group-containing copolymer 2 as particle-enlarging agent obtained in Referential Example 3 was added thereto. The resulting mixture was further stirred for 30 minutes to obtain particle-enlarged diene-based rubber latex. After a particle-enlarging operation, the polymer had a mean particle diameter of 0.38 μm.

Subsequently, into a reactor equipped with a reagent-feeder, a cooler, a jacket heater and a stirring device was charged a mixture of 10 parts (as expressed in terms of weight of solid component) of the diene-based rubber latex obtained above, 0.2 part of sodium N-lauroyl sarcosinate and 150 parts of deionized water together with 40 parts of butyl acrylate, 0.3 part of allyl methacrylate, 0.1 part of 1,3-butyleneglycol dimethacrylate and 0.14 part of cumene hydroperoxide.

After blowing nitrogen gas stream through the reactor to replace the inner atmosphere with nitrogen, the inner temperature was elevated to 60° C. When the temperature of the liquid in the reactor had reached 60° C., an aqueous solution prepared by dissolving 0.0001 part of ferrous sulfate, 0.0003 part of disodium ethylenediamine-tetraacetate and 0.24 part of Rongalit in 10 parts of distilled water was added to start a radical polymerization reaction. The reaction system was maintained in that state for one hour to complete the polymerization of the acrylate component. Thus, a latex of a composite rubber consisting of a particle-enlarged polybutadiene and a butyl acrylate rubber was obtained.

After the inner temperature of the reactor had descended to 60° C., an aqueous solution prepared by dissolving 0.4 part of Rongalit in 10 parts of distilled water was added, and then a liquid mixture of 6.3 parts of acrylonitrile, 18.7 parts of styrene and 0.23 part of cumene hydroperoxide was dropped into the reactor over a period of 2 hours to make progress a polymerization reaction. After the dropping, the resulting mixture was maintained in that state at 60° C. for one hour. Then, an aqueous solution prepared by dissolving 0.0002 part of ferrous sulfate, 0.0006 part of disodium ethylenediaminetetraacetate and 0.23 part of Rongalit in 10 parts of distilled water was added, and thereafter a liquid mixture of 6.3 parts of acrylonitrile, 18.7 parts of styrene and 0.23 part of cumene hydroperoxide was dropwise added over a period of 2 hours to make progress a polymerization reaction. After the dropping, temperature of the resulting mixture was kept at 60° C. for one hour, and then the mixture was cooled. Thus, a latex of a graft copolymer in which acrylonitrile/styrene was graft-polymerized onto a composite rubber consisting of particle-enlarged polybutadiene and a butyl acrylate rubber was obtained.

In the latex thus obtained, the mean particle diameter was 0.39 μm.

Subsequently, the polymer latex obtained above was thrown into a 0.15% aqueous solution of sulfuric acid, which had previously been heated to 90° C., in amount three times of that of total latex with stirring to coagulate the polymer. Then, the deposited mater was separated, washed and dried to obtain graft copolymer (B-3).

REFERENTIAL EXAMPLE 8

Preparation of Graft Copolymer (B-4)

A reactor equipped with a reagent-feeder, a cooler, a jacket heater and a stirring device was charged with 53.3 parts of the polyorganosiloxane latex prepared in Referential Example 4 and 0.3 part of sodium N-lauroyl sarcosinate, into which was then added and mixed 258.5 parts of distilled water. Subsequently, a mixture of 57 parts of butyl acrylate, 0.3 part of allyl methacrylate, 0.1 part of 1,3-butyleneglycol dimethacrylate and 0.14 part of cumene hydroperoxide was added.

After replacing the inner atmosphere of the reactor with nitrogen gas by passing a nitrogen gas stream, inner temperature of the flask was elevated to 60° C. When the inner temperature had reached 60° C., an aqueous solution prepared by dissolving 0.0001 part of ferrous sulfate, 0.0003 part of disodium ethylene-diaminetetraacetate and 0.24 part of Rongalit in 10 parts of distilled water was added to start a radical polymerization reaction. Due to a polymerization of the acrylate component, the liquid temperature ascended to 78° C. By maintaining the reaction mixture in this state for one hour and thereby completing the polymerization of the acrylate component, there was obtained a latex of a composite rubber made of polyorganosiloxane and a butyl acrylate rubber.

After the temperature of the liquid in the reactor had descended to 60° C., an aqueous solution prepared by dissolving 0.4 part of Rongalit in 10 parts of distilled water was added, and then a liquid mixture consisting of 12.9 parts of acrylonitrile, 38.8 parts of styrene and 0.23 part of cumene hydroperoxide was dropped over a period of 2 hours to make progress a polymerization reaction. After the dropping, the resulting mixture was kept in that state at a temperature of 60° C. for one hour. Then, an aqueous solution prepared by dissolving 0.0002 part of ferrous sulfate, 0.0006 part of disodium ethylenediamine-tetraacetate and 0.23 part of Rongalit in 10 parts of distilled water was added, and then a liquid mixture of 7.4 parts of acrylonitrile, 22.2 parts of styrene and 0.13 part of cumene hydroperoxide was dropwise added to make progress a polymerization reaction. After the dropping, the resulting mixture was kept in that state at a temperature of 60° C. for one hour and then cooled. Thus, there was obtained a latex of a graft copolymer in which acrylonitrile and styrene were graft-polymerized onto a composite rubber consisting of polyorganosiloxane and a butyl acrylate rubber.

The graft copolymer in the latex had a weight average particle diameter of 0.13 μm. On the other hand, 150 parts of an aqueous solution prepared by dissolving aluminum sulfate in water so as to have a concentration of 7.5% was kept stirred at a temperature of 60° C. One hundred parts of the latex of the graft copolymer obtained above was slowly and dropwise added to the stirred aluminum sulfate solution to coagulate the latex. The deposited matter was separated, washed and dried to obtain graft copolymer (B-4).

REFERENTIAL EXAMPLE 9

Preparation of Vinyl-based Copolymer (C-1)

Using 25 parts of acrylonitrile, 75 parts of styrene, 0.2 part of azobisisobutyronitrile and 0.5 part of t-dodecylmercaptan, a suspension polymerization (slurry polymerization) was carried out to obtain vinyl-based copolymer (C-1).

REFERENTIAL EXAMPLE 10

Preparation of Vinyl-based Copolymer (C-2)

Using 30 parts of acrylonitrile, 70 parts of styrene, 0.1 part of azobisisobutyronitrile and 0.4 part of t-dodecylmercaptan, a suspension polymerization was carried out to obtain vinyl-based copolymer (C-2).

EXAMPLE 1

Maleimide-based Copolymer (A-1)

After replacing the inner atmosphere of a polymerization reactor having a capacity of 20 liters and equipped with a stirrer with nitrogen gas, the following materials:

| | |
|---|---|
| N-phenylmaleimide | 25 parts |
| Styrene | 55 parts |
| acrylonitrile | 20 parts |
| methyl ethyl ketone | 25 parts |
| 1,1"-azobis (cyclohexane-1-carbonitrile) | 0.01 part |
| t-dodecylmercaptan | 0.05 part | were continuously fed into the reactor. While maintaining the reactor at a constant inner temperature of 110° C., the polymerization liquid mixture was continuously withdrawn by means of a gear pump placed at the bottom of the reactor so as to give an average residence time of 2 hours. The polymerization liquid mixture which had been withdrawn was subsequently made to stay in a heat exchanger kept at 150° C. for about 20 minutes. Then, the mixture was introduced into a two-vent type double screw extruder having a cylinder temperature of 230° C. and devolatilized, while keeping the first vent at an atmospheric pressure and the second vent at a reduced pressure of 2.67 kPa abs, and while continuously feeding 0.38 part of dicyclopentadiene just before the second vent. The strand discharged from the extruder was pelletized by means of a pelletizer to obtain maleimide-based copolymer (A-1). Properties of the copolymer thus obtained were as shown in Table 1.

EXAMPLE 2

Using 0.12 part of dicyclopentadiene, a maleimide-based copolymer was prepared in the same manner as in Example 1. Properties of the copolymer thus obtained were as shown in Table 1.

EXAMPLE 3

Using 0.07 part of dicyclopentadiene, a maleimide-based copolymer was prepared in the same manner as in Example 1. Properties of the copolymer thus obtained were as shown in Table 1.

COMPARATIVE EXAMPLE 1

Maleimide-based Copolymer (A-2)

A maleimide-based copolymer (A-2) was prepared in the same manner as in Example 1, provided that the formed copolymer was extruded and pelletized by means of a vented double screw extruder without adding dicyclopentadiene. Properties of the copolymer thus obtained were as shown in Table 1.

EXAMPLE 4

Using 0.6 part of t-dodecylmercaptan, a maleimide-based copolymer was prepared in the same manner as in Example 1, provided that the polymer was extruded and pelletized while adding 0.39 part of dicyclopentadiene just before the second vent of double screw extruder. Properties of the copolymer thus obtained were as shown in Table 1.

COMPARATIVE EXAMPLE 2

A maleimide-based copolymer was prepared in the same manner as in Example 4, provided that the polymer was extruded and pelletized by means of a vented double screw extruder without an addition of dicyclopentadiene. Properties of the copolymer thus obtained were as shown in Table 1.

EXAMPLE 5

The maleimide-based copolymer obtained in Comparative Example 1 was extruded and pelletized by means of a vented double screw extruder while adding 0.05 part of dicyclopentadiene to 100 parts of the maleimide-based copolymer, at a cylinder temperature of 250° C. while maintaining the vent part under a condition of 2.67 kPa abs. Properties of the copolymer thus obtained were as shown in Table 1.

COMPARATIVE EXAMPLE 3

A maleimide-based copolymer was prepared in the same manner as in Example 5, provided that the polymer was extruded and pelletized by means of a vented double screw extruder without an addition of dicyclopentadiene. Properties of the copolymer thus obtained were as shown in Table 1.

EXAMPLE 6

A mixture of 70 parts of the maleimide-based copolymer (A-1) obtained in Example 1 and 30 parts of the graft copolymer (B-1) obtained in Referential Example 5 was extruded and pelletized by means of a vented double screw extruder at a cylinder temperature of 250° C. and under a condition of 2.67 kPa abs of a vent part. Properties of the thermoplastic resin composition thus obtained were as shown in Table 2.

EXAMPLE 7

While adding 0.05 part of dicyclopentadiene to a mixture of 70 parts of the maleimide-based copolymer (A-2) obtained in Comparative Example 1 and 30 parts of the graft copolymer (B-1) obtained in Referential Example 5, the resulting mixture was extruded and pelletized by means of a vented double screw extruder at a cylinder temperature of 250° C. and was maintained under a condition of 2.67 kPa abs of a vent part. Properties of the thermoplastic resin composition thus obtained were as shown in Table 2.

COMPARATIVE EXAMPLE 4

A pellet was prepared without an addition of dicyclopentadiene in the same manner as in Example 7. Properties of the thermoplastic resin composition thus obtained were as shown in Table 2.

EXAMPLE 8

While adding 0.1 part of dicyclopentadiene to a mixture of 70 parts of the maleimide-based copolymer (A-2) obtained in Comparative Example 1 and 30 parts of the graft copolymer (B-3) obtained in Referential Example 7, the resulting mixture was extruded and pelletized by means of a vented double screw extruder at a cylinder temperature of 250° C. and under a condition of 2.67 kPa abs of a vent part. Properties of the thermoplastic resin composition thus obtained were as shown in Table 2.

COMPARATIVE EXAMPLE 5

A pellet was prepared without an addition of dicyclopentadiene in the same manner as in Example 8. Properties of the thermoplastic resin composition thus obtained were as shown in Table 2.

EXAMPLE 9

While adding 0.1 part of dicyclopentadiene to a mixture of 45 parts of the maleimide-based copolymer (A-2) obtained in Comparative Example 1, 40 parts of the graft copolymer (B-4) obtained in Referential Example 8 and 15 parts of the vinyl-based copolymer (C-1) obtained in Referential Example 9, the resulting mixture was extruded and pelletized by means of a vented double screw extruder at a cylinder temperature of 250° C. and under a condition of 2.67 kPa abs of a vent part. Properties of the thermoplastic resin composition thus obtained were as shown in Table 2.

COMPARATIVE EXAMPLE 6

A pellet was prepared without an addition of dicyclopentadiene in the same manner as in Example 9. Properties of the thermoplastic resin composition thus obtained were as shown in Table 2.

EXAMPLE 10

While adding 0.05 part of dicyclopentadiene and 0.2 part of magnesium oxide to a mixture of 55 parts of the maleimide-based copolymer (A-2) obtained in Comparative Example 1, 40 parts of the graft copolymer (B-2) obtained in Referential Example 6 and 5 parts of the vinyl-based copolymer (C-2) obtained in Referential Example 10, the resulting mixture was extruded and pelletized by means of a vented double screw extruder at a cylinder temperature of 250° C. and under a condition of 3 kPa abs of a vent part. Properties of the thermoplastic resin composition thus obtained were as shown in Table 2. The extent of die pollution was found to be the smallest in this example in all examples presented in this specification.

COMPARATIVE EXAMPLE 7

A pellet was prepared without an addition of dicyclopentadiene in the same manner as in Example 10. Properties of the thermoplastic resin composition thus obtained were as shown in Table 2.

EXAMPLE 11

Using 85 parts of methyl methacrylate, 9 parts of α-methylstyrene and 6 parts of maleic anhydride, a bulk polymerization was carried out to obtain an unsaturated dicarboxylic acid anhydride-based copolymer containing 0.12 part of unreacted maleic anhydride. Then, 0.4 part of dicyclopentadiene was added to 100 parts of the copolymer obtained above and the resulting mixture was extruded and pelletized by means of a vented double screw extruder at a cylinder temperature of 260° C. and under a condition of 2.67 kPa abs of a vent part. Thus, an unsaturated dicarboxylic acid anhydride-based copolymer was obtained. Properties of the copolymer obtained herein were as shown in Table 3.

COMPARATIVE EXAMPLE 8

An unsaturated dicarboxylic acid anhydride-based copolymer was prepared by pelletizing the polymer without an addition of dicyclopentadiene in the same manner as in Example 7. Properties of the copolymer thus obtained were as shown in Table 3.

It is apparent from the examples and comparative examples present above that, according to the present invention, there can be obtained copolymers and thermoplastic resin compositions having a much reduced content of unreacted maleimide-based monomer and/or unreacted unsaturated dicarboxylic acid anhydride-based monomer, and an appearance of molded articles thereof is superior to that of molded articles obtained from the copolymers according to prior art.

TABLE 1

| | Composition of copolymer | | | Amount of residual unreacted monomers | | Adduct of conjugated diene-based | Reduced | | Vicat softening | Pollution |
|---|---|---|---|---|---|---|---|---|---|---|
| | PMI (%) | ST (%) | AN (%) | PMI (ppm) | Others (%) | compound (ppm) | viscosity (dl/g) | YI | temperature (° C.) | of die (Visuals) |
| Example 1 | 25 | 55 | 20 | 20 | 0.28 | 770 | 0.68 | 19 | 146 | o |
| Example 2 | 25 | 55 | 20 | 20 | 0.29 | 750 | 0.68 | 19 | 146 | o |
| Example 3 | 25 | 55 | 20 | 10 | 0.29 | 750 | 0.68 | 19 | 146 | o |
| Example 4 | 25 | 55 | 20 | 30 | 0.28 | 1,100 | 0.34 | 25 | 145 | Δ |
| Example 5 | 25 | 55 | 20 | 20 | 0.27 | 660 | 0.68 | 25 | 145 | o |
| Compara. Example 1 | 25 | 55 | 20 | 580 | 0.27 | 0 | 0.68 | 22 | 146 | x |
| Compara. Example 2 | 25 | 55 | 20 | 840 | 0.29 | 0 | 0.34 | 29 | 146 | xx |
| Compara. Example 3 | 25 | 55 | 20 | 500 | 0.25 | 0 | 0.68 | 27 | 145 | x |

PMI: N-Phenylmaleimide
ST: Styrene
AN: Acrylonitrile
Pollusion of die:
o No pollution is visually noticeable.
Δ Partial pollution is visually noticeable.
x Pollution is noticeable visually.
xx Remarkable pollution is noticeable visually.

TABLE 2

| | Composition of resin | | | Amount of residual unreacted monomers | | Adduct of conjugated diene-based | Izod impact | | | Vicat softening | Pollution |
|---|---|---|---|---|---|---|---|---|---|---|---|
| | Maleimide-based co-polymer (parts) | Graft co-polymer (parts) | Other thermo-plastic resin (parts) | PMI (ppm) | Others (%) | compound (ppm) | strength (J/m) | Melt flow (g/10 min.) | Rockwell hardness | temperature (° C.) | of die (Visual) |
| Example 6 | (A-1) 70 | (B-1) 30 | | 10 | 0.21 | 350 | 100 | 1.7 | 110 | 130 | o |
| Example 7 | (A-2) 70 | (B-1) 30 | | 5 | 0.23 | 80 | 110 | 1.5 | 110 | 131 | o |

TABLE 2-continued

| | Composition of resin | | | Amount of residual unreacted monomers | | Adduct of conjugated diene-based compound (ppm) | Izod impact strength (J/m) | Melt flow (g/10 min.) | Rockwell hardness | Vicat softening temperature (° C.) | Pollution of die (Visual) |
|---|---|---|---|---|---|---|---|---|---|---|---|
| | Maleimide-based co-polymer (parts) | Graft co-polymer (parts) | Other thermo-plastic resin (parts) | PMI (ppm) | Others (%) | | | | | | |
| Example 8 | (A-2) 70 | (B-3) 30 | | 10 | 0.27 | 110 | 80 | 2.3 | 114 | 132 | o |
| Example 9 | (A-2) 45 | (B-4) 40 | (C-1) 15 | 5 | 0.29 | 190 | 100 | 3.7 | 102 | 119 | o |
| Example 10 | (A-2) 55 | (B-2) 40 | (C-2) 5 | 5 | 0.26 | 80 | 120 | 3.2 | 105 | 122 | o |
| Compara. Example 4 | (A-2) 70 | (B-1) 30 | | 50 | 0.22 | 0 | 100 | 1.6 | 110 | 130 | Δ |
| Compara. Example 5 | (A-2) 70 | (B-3) 30 | | 90 | 0.28 | 0 | 70 | 2.6 | 112 | 130 | x |
| Compara. Example 6 | (A-2) 45 | (B-4) 40 | (C-1) 15 | 140 | 0.27 | 0 | 100 | 3.8 | 102 | 119 | x |
| Compara. Example 7 | (A-2) 55 | (B-2) 40 | (C-2) 5 | 40 | 0.24 | 0 | 120 | 3.1 | 105 | 123 | Δ |

PMI: N-Phenylmaleimide
Pollusion of die:
o No pollution is visually noticeable.
Δ Partial pollution is visually noticeable.
x Pollution is noticeable visually.
xx Remarkable pollution is noticeable visually.

TABLE 3

| | Composition of copolymer | | | Amount of residual unreacted monomers | | Adduct of conjugated diene-based compound (ppm) | Reduced viscosity (dl/g) | YI | Vicat softening temperature (° C.) | Pollution of die (Visual) |
|---|---|---|---|---|---|---|---|---|---|---|
| | MAH (%) | MS (%) | MMA (%) | MAH (ppm) | Others (%) | | | | | |
| Example 11 | 6 | 9 | 85 | 140 | 0.25 | 1,800 | 0.53 | 8 | 128 | Δ |
| Compara. Example 8 | 6 | 9 | 85 | 1,200 | 0.24 | 0 | 0.53 | 10 | 128 | xx |

MAH: Maleic anhydride
MS: α-Methylstyrene
MMA: Methyl methacrylate
Pollusion of die:
o No pollution is visually noticeable.
Δ Partial pollution is visually noticeable.
x Pollution is noticeable visually.
xx Remarkable pollution is noticeable visually.

INDUSTRIAL APPLICABILITY

The maleimide-based copolymer, unsaturated dicarboxylic acid anhydride-based copolymer and thermoplastic resin composition containing these copolymers according to the present invention are superior in heat resistance and exhibits an excellent moldability and appearance of molded article, and therefore can be used as molded articles in various fields such as electronic and electric instruments, automobiles, etc.

What is claimed is:

1. A composition comprising a copolymer comprising polymerized units of a maleimide monomer and/or polymerized units of an unsaturated dicarboxylic acid anhydride monomer, unpolymerized maleimide monomer and/or unpolymerized unsaturated dicarboxylic acid anhydride monomer in an amount of 200 ppm or less, and an adduct of a compound and said maleimide monomers and/or said unsaturated dicarboxylic acid anhydride monomers, in an amount of 0.1 to 3,000 ppm,
wherein the adduct is not an adduct of the copolymer.

2. The composition according to claim 1, comprising a copolymer comprising (a) 15 to 65% by weight of polymerized units of a maleimide monomer, and
(b) 85 to 35% by weight of polymerized units of at least one monomer selected from the group consisting of an aromatic vinyl monomer and another vinyl monomer, wherein the total amount of (a) and (b) is 100% by weight, and
wherein the unpolymerized maleimide monomer is present in an amount of 50 ppm or less, and a volatile component other than the maleimide monomer is present in an amount of 0.5% by weight or less.

3. The composition according to claim 2, wherein the maleimide monomer is N-phenylmaleimide, the aromatic vinyl monomer is styrene, and the other vinyl monomer is acrylonitrile.

4. The composition according to claim 1, wherein the composition comprises unpolymerized maleimide monomer in an amount of 30 ppm or less, a total volatile component other than the maleimide monomer in an amount of 0.3% by weight or less, and the adduct in an amount of 0.1 to 1,000 ppm.

5. The composition according to claim 1, comprising a copolymer comprising:
  (a) 5 to 50% by weight of polymerized units of an unsaturated dicarboxylic acid anhydride monomer and
  (b) 95 to 50% by weight of polymerized units of at least one monomer selected from the group consisting of an aromatic vinyl monomer and another vinyl monomer, wherein the total amount of (a) and (b) is 100% by weight, and
    wherein the composition further comprises unpolymerized unsaturated dicarboxylic acid anhydride monomer in an amount of 150 ppm or less, a volatile component other than the unsaturated dicarboxylic acid anhydride monomer in an amount of 0.5% by weight or less, and the adduct in an amount of 0.1 to 3,000 ppm.

6. The composition according to claim 5, wherein the unsaturated dicarboxylic acid anhydride monomer is maleic anhydride, the aromatic vinyl monomer is styrene or α-methylstyrene, and the other vinyl monomer is methyl methacrylate.

7. The composition according to claim 1, wherein the adduct is an adduct of a conjugated diene.

8. The composition according to claim 7, wherein the conjugated diene is 1,3-butadiene, isoprene, chloroprene, cyclopentadiene or 1,3-cyclohexadiene.

9. A process for producing the composition according to claim 1, which comprises
  adding a compound other than the copolymer to a monomer mixture comprising the maleimide monomer, the unsaturated dicarboxylic acid anhydride monomer or a mixture thereof, before, during or after polymerizing, or to a copolymer comprising polymerized units of the monomer.

10. The process according to claim 9, wherein the compound comprises a conjugated diene or a compound forming a conjugated diene.

11. A process for producing the composition according to claim 1, which comprises
  polymerizing a monomer mixture comprising a maleimide monomer, an unsaturated dicarboxylic acid anhydride monomer or a mixture thereof, to form a copolymer comprising polymerized monomer units,
  introducing the copolymer into a devolatilizing extruder to remove the volatile components, and
  adding a compound other than the polymerized or unpolymerized monomer units to said devolatilizing extruder at the time of devolatilization.

12. The process according to claim 9, wherein the compound is dicyclopentadiene.

13. A composition comprising:
  (A) 20 to 90 parts by weight of a copolymer comprising
    (a) 15 to 65% by weight of polymerized units of a maleimide monomer and (b) 85 to 35% by weight of polymerized units of at least one monomer selected from the group consisting of an aromatic vinyl monomer and another vinyl monomer, wherein the total amount of (a) and (b) is 100% by weight,
  (B) 80 to 10 parts by weight of a graft polymer obtained by polymerizing at least one monomer selected from the group consisting of the aromatic vinyl monomer and the other vinyl monomer in the presence of a rubbery polymer, and
  (C) 0 to 100 parts by weight of another thermoplastic resin,
    wherein said composition comprises unpolymerized maleimide monomer in an amount of 10 ppm or less, a volatile component other than said maleimide monomer in an amount of 0.5% by weight or less, and an adduct of a compound and said maleimide-based monomer in an amount of 0.1 to 3,000 ppm, where the adduct is not an adduct of the copolymer.

14. The composition according to claim 13, wherein the maleimide monomer is N-phenylmaleimide, the aromatic vinyl monomer is styrene, and the other vinyl monomer is acrylonitrile.

15. The composition according to claim 13, wherein the adduct is an adduct of a conjugated diene.

16. The composition according to claim 15, wherein the conjugated diene is 1,3-butadiene, isoprene, chloroprene, cyclopentadiene, 1,3-cyclohexadiene, furan or anthracene.

17. A process for producing the composition according to claim 13, which comprises
  polymerizing a monomer mixture comprising a maleimide monomer and an aromatic vinyl monomer and/or another vinyl monomer to form a maleimide copolymer comprising polymerized units of the monomers, and
  optionally adding to the maleimide copolymer a compound other than the copolymer, the graft polymer or other thermoplastic resin.

18. A process for producing the composition according to claim 13, which comprises
  polymerizing a monomer mixture comprising a maleimide monomer and an aromatic vinyl monomer and/or other vinyl monomer to form a maleimide copolymer,
  melt-kneading the maleimide copolymer with a graft polymer and, optionally, another thermoplastic resin by mixing, and
  adding a compound other than the polymerized and unpolymerized monomer units at the time of melt-kneading.

* * * * *